United States Patent [19]

Ichigaya et al.

[11] Patent Number: 5,077,600
[45] Date of Patent: Dec. 31, 1991

[54] SELF-INSPECTING CONVERGENCE MEASURING APPARATUS

[75] Inventors: Hiroshi Ichigaya, Saitama; Satoshi Sato, Kanagawa, both of Japan

[73] Assignee: Sony Corporation, Tokyo, Japan

[21] Appl. No.: 591,048

[22] Filed: Oct. 1, 1990

[30] Foreign Application Priority Data

Oct. 3, 1989 [JP] Japan ................................. 1-258283
Oct. 3, 1989 [JP] Japan ................................. 1-258284

[51] Int. Cl.$^5$ ...................... H04N 17/02; H04N 17/00
[52] U.S. Cl. ...................................... 358/10; 358/139; 324/404; 315/368.11
[58] Field of Search .................. 358/10, 139, 903, 65, 358/71, 72, 64; 324/404; 315/368

[56] References Cited

U.S. PATENT DOCUMENTS

| | | | |
|---|---|---|---|
| 4,441,120 | 4/1984 | Gerritsen | 358/10 |
| 4,593,309 | 6/1986 | Uno et al. | 358/10 |
| 4,686,429 | 8/1987 | Fendley | 315/368 |
| 4,897,721 | 1/1990 | Young et al. | 358/139 |
| 4,925,420 | 5/1990 | Fourche et al. | 445/3 |
| 4,989,072 | 1/1991 | Sato et al. | 358/10 |

Primary Examiner—James J. Groody
Assistant Examiner—Safet Metjaliic
Attorney, Agent, or Firm—Philip M. Shaw, Jr.

[57] ABSTRACT

A convergence measurement apparatus for a color CRT comprising a light sensor which is placed on the face of a CRT to be tested, a CPU, and a pattern generator which causes a plurality of luminescent lines of a primary color to be displayed on one area of the CRT screen and a plane area comprised of a composite of the two other primary colors to be displayed on another area of the screen. The plurality of lines are shifted at a given rate along the designated area of the screen, the color of the displayed lines successively changing to show each primary color. The light sensor receives light intensity information from the generated pattern and the CPU calculates a mis-convergence value based on the light intensity data. The apparatus further includes a self-inspection feature by which the processing is executed for successive measurement of the same primary color. If the values for each measurement are identical the system is assumed to be operating normally and if there is variation, abnormal operation can be diagnosed.

9 Claims, 10 Drawing Sheets

SELF-INSPECTING CONVERGENCE MEASURING APPARATUS

BACKGROUND OF THE INVENTION

The present invention relates generally to a convergence measuring apparatus for measuring the convergence state of a color CRT of a television receiver or the like.

As is well known, in color CRTs uniform convergence of primary colors in the CRT is desirable to provide a high quality image display. One aspect of quality control in the manufacture of CRTs is convergence measurement.

Previously proposed convergence measuring devices are exemplified by a phase detection type convergence measuring device such as disclosed in Japanese Patent Application No. 63-310670, by the same applicant as the present invention. In these prior proposed apparatus, a pattern generator outputs image signals to a color CRT to be measured. The pattern generator produces image signals by which a luminescent line (horizontal or vertical) of a primary color is shifted on one of the domains of the viewing area of the CRT with a white area being cast on another domain. An image sensor having a single humped directional sensitivity is positioned on the face of the CRT.

With this arrangement, the light sensor is positioned at an arbitrary position on the viewing screen of the CRT and a luminescent line of each primary color is cast on the viewing screen by the pattern generator. A computer then creates an envelope curve for each of the primary colors in accordance with a detection output, corresponding to each of the primary colors, from the light sensor so as to obtain the position of the peak value of each envelope curve, and compares the positions of the peak values of the primary colors with each other so as to calculate a mis-convergence value. Further, the position of the light sensor is changed on the viewing screen of the CRT so that the measurement is carried out at several positions thereon.

The reason for providing a white domain during the above-described measurement is, if the respective luminescent lines of green, red and blue are solely cast on the viewing screen the beam current of the CRT changes, causing high-voltage variation. Such variation causes a positional shift of an electronic peak for each color, and accordingly the white domain is provided to stabilize high voltage variations.

However, a number of problems exist with this system of measurement. First of all, even though the white domain is provided as mentioned above, since the current value of a luminescent line of the presently displayed color is greater than that of the other colors, the current values of the RGB beams vary each time the color of the luminescent line is changed. High voltage variations caused by the change in current value, by way of a voltage drop, cause a positional shift of the luminescent line which gives rise to measurement error.

In order to prevent the above occurrence it is generally understood that the width of the displayed primary color lines can be reduced to minimize the difference between the current values of the colors. But, if the width of the luminescent line is narrowed, disadvantages such as deterioration of the signal to noise (S/N) ratio or the like would occur. Accordingly this is not a viable way of solving the problem.

Further, with the above-described type of measuring apparatus although the convergence condition of a color CRT can easily be measured, unless the measuring apparatus itself is operating properly, precise measurement results cannot, of course, be expected. Thus, checking has conventionally been done by using a 'control' CRT or a dummy signal generator. The former involves the use of a color CRT prepared so as to have a known mis-convergence value. This known data is then compared with measurement data in order to check the measurement apparatus. In the latter case a dummy signal simulating a known luminescence of a color CRT is generated from the dummy signal generator and the dummy signal is used in place of an output from the light sensor to be input to the measuring apparatus so as to check its accuracy.

The drawbacks of these methods are that they both require the use of bulky extra equipment, such as a standard CRT or a dummy signal generator. As a result, such checking is difficult to implement smoothly during use of the measuring equipment.

SUMMARY OF THE INVENTION

It is accordingly one object of the present invention to avoid the disadvantages of the prior art.

It is another object of the invention to provide a convergence measurement apparatus which can prevent variations between the current values of primary colors caused by variations in high voltage, so as to eliminate errors in measurement.

A further object of the invention is to provide a convergence measuring apparatus in which checking can be performed smoothly without disruption or use of extra equipment.

A still further object of the invention is to provide a convergence measurement apparatus in which checking can be performed without the use of external apparatus and with minimal disruption of normal operation.

According to one aspect of the present invention, the above stated objects can be achieved by providing a convergence measurement apparatus comprising: pattern generating means for generating for display on a display screen of a CRT, a plane signal and a color bar signal for convergence measurement; light sensing means having a single peaked directional response for outputting a signal representative of input light received from the display screen; and, mis-convergence calculating means for calculating color data output from the light sensor.

According to a further aspect of the invention the stated objects can be achieved by providing a convergence measuring apparatus for color CRTs comprising: pattern generating means for generating a color bar signal for convergence measurement on a display screen of the CRT; a light sensor attached to the face of the CRT under test, the light sensor having a single peaked directional response and the sensor outputting a signal representative of input light; mis-convergence calculating means for calculating color data output from the light sensor; and, checking means for controlling the pattern generator to display a selected color.

According to a still further aspect of the invention the stated objects can be achieved by providing a self-inspecting convergence measurement apparatus for color CRTs comprising: light sensing means having a single peaked directional response, for receiving light from a screen of a CRT to be tested; pattern generating means for generating a pattern on the screen of the CRT to be tested for providing light to the light sensing means, the pattern including a measuring area of a bar pattern of a selectable color and a plane area comprised of at least two colors not including a color of the bar pattern; and measuring means for measuring the intensity of the light received by the light sensing means.

Memory means are provided for storing the light intensity data for a plurality of colors received by the light sensing means. Calculating means calculate a misconvergence value based on light intensity values for the plurality of colors stored in the memory means. Setting means are operable to set the position of the bar pattern and the plane area on the CRT screen such that, when a modulation value of the light received by the light sensing means is below a first predetermined value or above a second predetermined value, the setting means adjusts the line interval of the bar patterns so as to bring the modulation value within a range between the first and second predetermined values. Inspection means is selectively operable to cause the pattern generator, the measuring means, the calculating means and the setting means to successively process light intensity data for a single color. The inspection means compares the light intensity data generated thereby to determine variations therein. Display means displays the mis-convergence value determined by the calculating means and is also operable to display data generated by the inspection means.

BRIEF DESCRIPTION OF THE DRAWINGS

The present invention is described with reference to the drawings described below which are for example only and do not imply limitation to the invention.

DESCRIPTION OF THE PREFERRED EMBODIMENT

Hereinbelow, the present invention will be described in detail with reference to the accompanying drawings which illustrate the preferred embodiments thereof.

Figure 1:
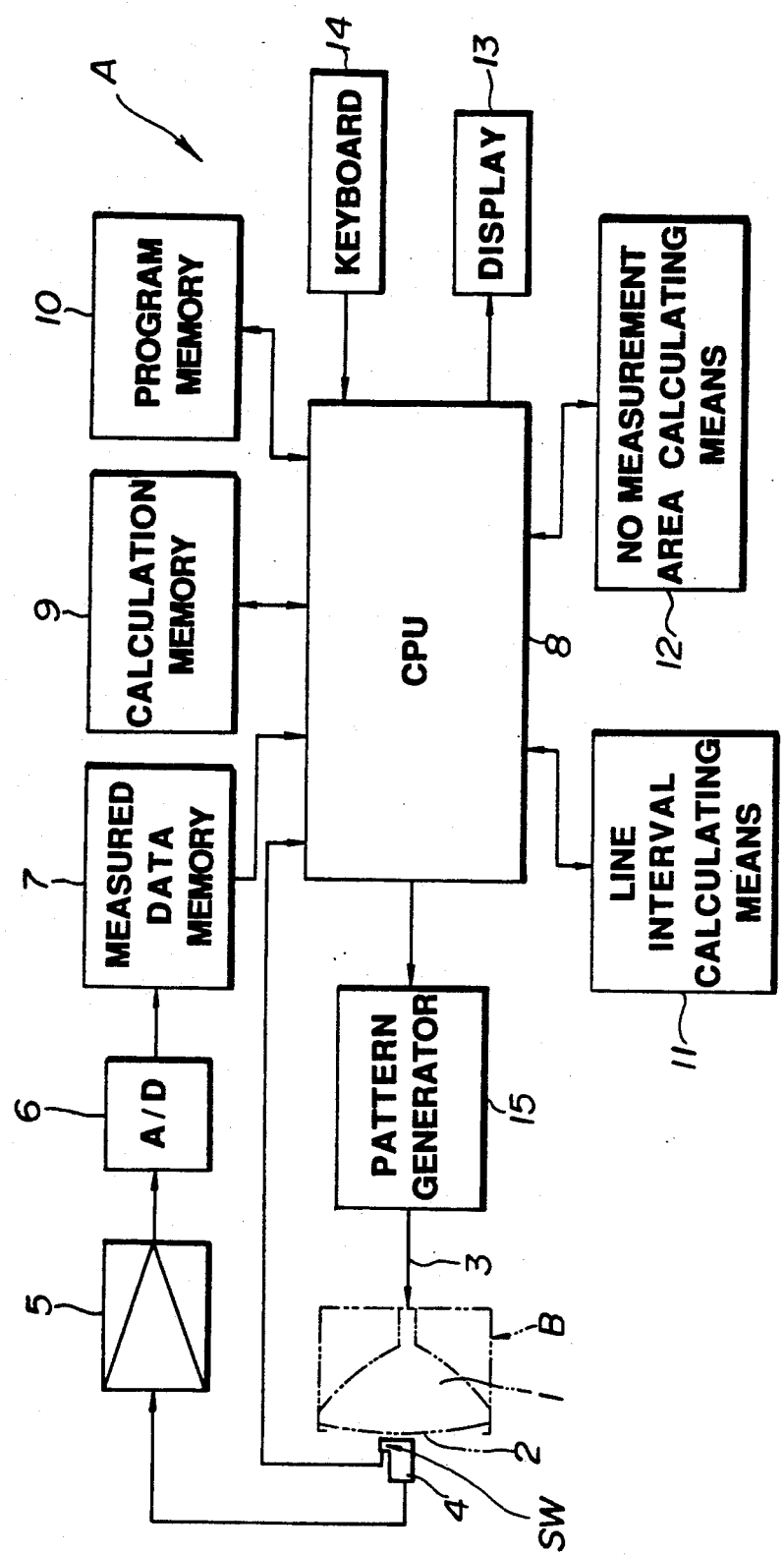
FIG. 1 is a block diagram of a convergence measurement apparatus according to the present invention.
Figure 2:
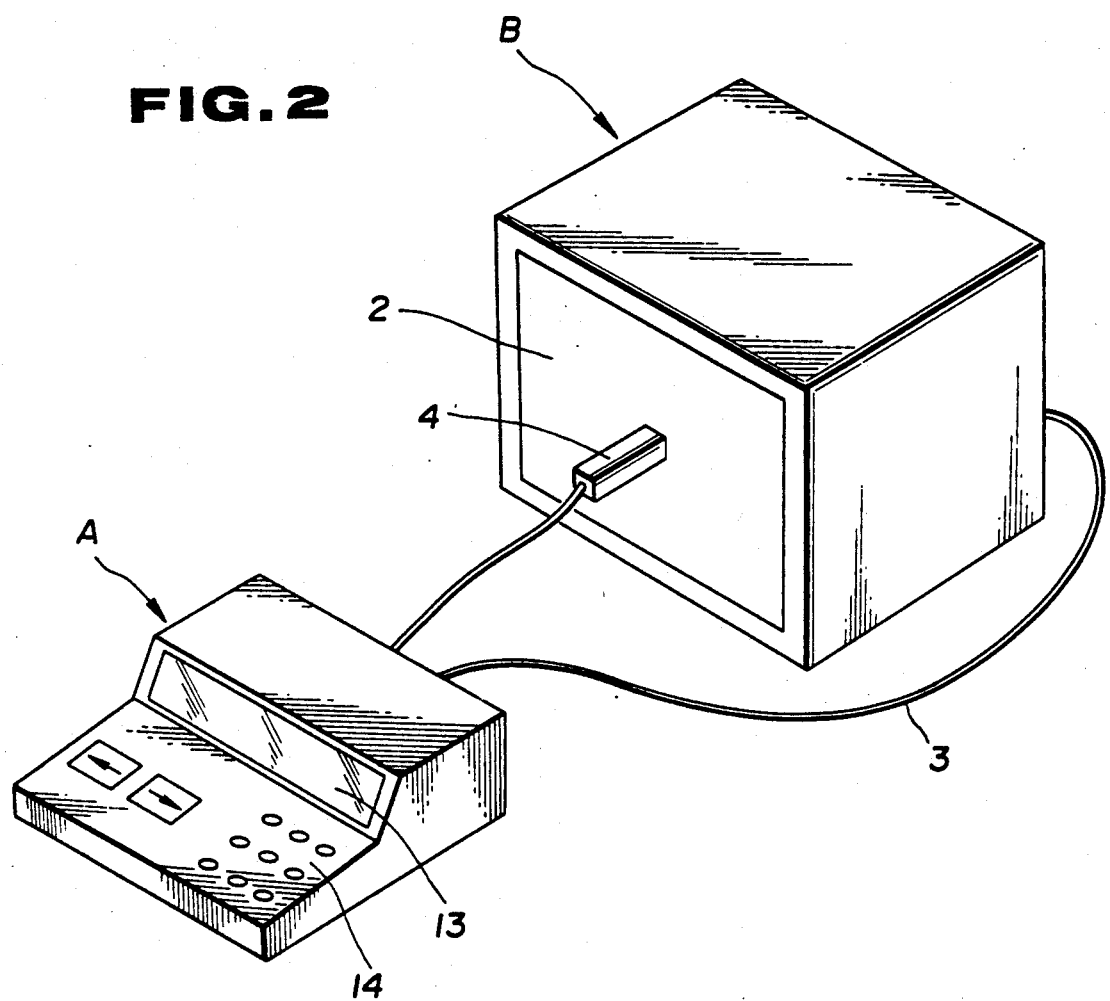
FIG. 2 is a perspective view of the apparatus of FIG. 1 together with a CRT color monitor under test.

FIG. 2 shows a convergence measuring apparatus A arranged in a measuring condition. Referring to FIGS. 1 and 2, a television receiver B incorporates a color CRT 1 to be measured. A display screen 2 of the CRT is exposed in front and a signal cable 3 from the convergence measuring apparatus A is connected to image signal input terminals on the television receiver B such that image signals output from the convergence measuring apparatus are displayed on the CRT 1.

Further, the convergence measuring apparatus A includes a light sensor 4 which is connected thereto by a cable, and which is arranged in contact with the display screen 2 so as to receive light output therefrom.

Figure 3:
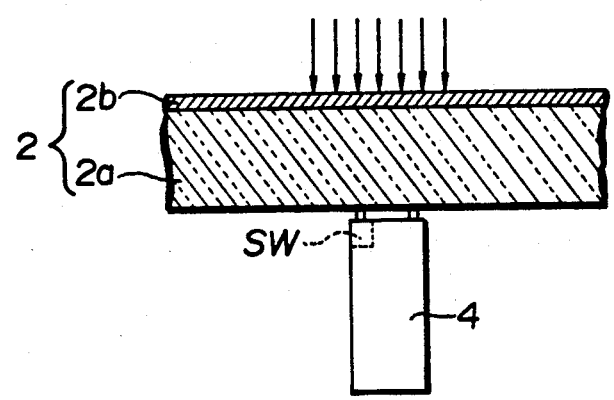
FIG. 3 is a horizontal sectional view of a portion of a CRT screen and shows the placement of a light sensor on the face of a color CRT according to a preferred embodiment of the present invention.

FIG. 3 shows a cross-sectional view illustrating the positional relationship between the display screen and the light sensor 4. Referring to FIG. 3 the viewing screen 2 has a glass panel 2a having an inner surface on which a phosphor section 2b is laid. The phosphor section 2b luminesces when an electron beam is irradiated thereon. Furthermore a microswitch SW is provided in the light sensor 4. Accordingly, when the light sensor contacts the display screen 2 the microswitch is set to ON. An ON signal from the microswitch SW initiates the measurement routine which runs in accordance with the flow chart of FIG. 11, as will be explained later.

Figure 4:
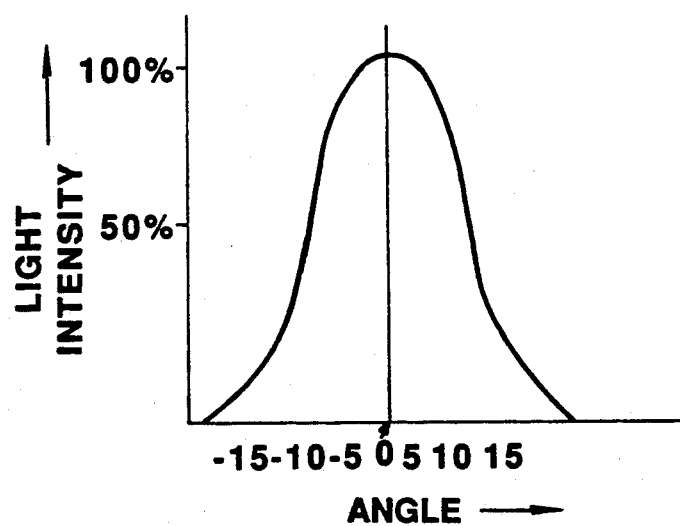
FIG. 4 is a graph showing the light sensitivity characteristic of the light sensor shown in FIG. 3.

FIG. 4 shows the directional sensitivity characteristic of the light sensor. The angle (degree) of light incident upon the light sensor 4 from display screen 2 of the CRT 1 is indicated on the axis of the abscissa and the strength of the intensity of the light incident upon the light sensor 4 at incident angles, that is, the relative light intensity, which has a value of 100 when the angle of incidence is zero, is shown on the ordinate axis. The larger the absolute value of the angle of incidence, the smaller the light intensity becomes, which gives the light sensor 4, a so-called single humped characteristic in which the light intensity becomes zero % when the absolute value of the incident angle is substantially 20 degrees.

FIG. 1 is a view illustrating a circuit block diagram of a convergence measuring apparatus A. As seen in FIG. 1 a detection output (light intensity data) of the light sensor 4 is input to an A/D converter 6 by way of an amplifier 5, and is therefore consequently converted to a digital signal by the A/D converter 6. The digital light intensity data is then written into a measuring data memory 7 in accordance with a write signal from a CPU 8. The CPU 8 further controls the read-in and write-out of data from a computing memory 9 and a program memory 10. In the computing memory 9 calculation data is stored which is required for several calculation processings. In the program memory 10 there is stored data for carrying out a measuring program, a modulation degree calculating program, a mis-convergence value calculation program, a self-inspection program and a display program. The contents of these programs will be explained according to the present embodiment.

The modulation degree calculating program lists a maximum value MAX and a minimum value MIN for light intensity data of a primary color which is to be measured, and determines a modulation degree F according to the following equation:

$$F=(MAX-MIN)/(MAX+MIN) \qquad (1)$$

It is determined to be an appropriate value if this modulation degree F falls in a range of 0.2 to 0.6, and is determined to be inappropriate outside this range. If the modulation degree F is determined to be inappropriate, the modulation degree data is transferred to a line interval calculating means 11, which will be described later. Further, if the modulation degree is substantially zero (0), a change instruction is forwarded to a no measurement area calculating means 12. It is noted that the modulation degree calculation program determines the modulation degree from the difference between the maximum value and the minimum value in light intensity according to the present embodiment, however, the modulation degree can also be determined by the condition of an envelope curve of light intensity data (for example a difference between a maximum and minimum value of a curve or inclination angle).

Figure 5:
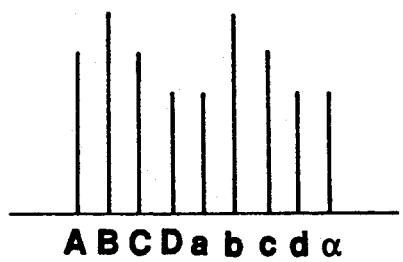
FIG. 5 shows an envelope curve interpolated from discrete light intensity data according to the processing executed by the present invention.
Figure 6:
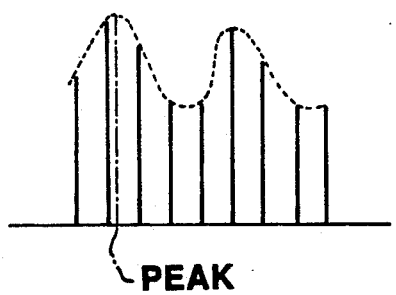
FIG. 6 shows an envelope curve as shown in FIG. 5 wherein a peak position has been determined.

The mis-convergence value calculating program interpolates discrete light intensity data (shown in FIG. 5) read from the measuring data memory 9 so as to convert the data into light intensity data (an envelope curve) which varies finely as shown by the broken line in FIG. 6 and detects therefore a time point (position) at which a peak value of the light intensity data of each of the primary colors can be obtained. Then the difference between the time point at which the peak value of the light intensity of, for example, green, is obtained, and the time point at which the peak value of the light intensity of red or blue is obtained, that is, a mis-convergence value is calculated.

The CPU 8 drives and controls the line interval calculating means 11, as well as the no measurement area calculating means 12 and a display section 13. The line interval calculating means 11 causes the CPU 8 to output luminescent line interval data in accordance with the modulation degree. The no measurement area calculating means 12 designates a domain $S_2$ (FIG. 7) not to be measured, that is, it sets either one of a right quarter or a left quarter of the display screen 2 as the domain $S_2$ according to this embodiment. When the CPU 8 outputs an instruction for changing the domain not to be measured, the domain not to be measured is changed from the current quarter to the other one.

It is noted that the display section 13 displays a mis-convergence value or the like and a modulation degree in order to facilitate manual correction of the intervals of the luminescent lines if no line interval calculating section is incorporated.

The self-inspection program run by the CPU 8 controls a pattern generator 15, which will be described hereinbelow, operates so as to allow the pattern generator 15 to output patterns of luminescent lines all having the same color such as red for example, and executes the measuring program, the computing program and the display program for each pattern, similar to the routine of measurement processing. That is to say, in this embodiment, an inspection mode signal is transmitted to the pattern generator 15, and the other process steps are carried out with the help of the existing programs. Accordingly, self-inspection can be accomplished with only slight deviation from the normal running routine.

Further, the CPU 8 receives signals from a keyboard 14. Input from the keyboard 14 can be used to update data in the computing memory 9, the program memory 10 and the like. The keyboard also incorporates a self-inspection key (not shown) which is selected for activating the self-inspection program. Also, if the luminescent line intervals are to be manually corrected, data can be input from the keyboard 14 to effect such correction.

Figure 7:
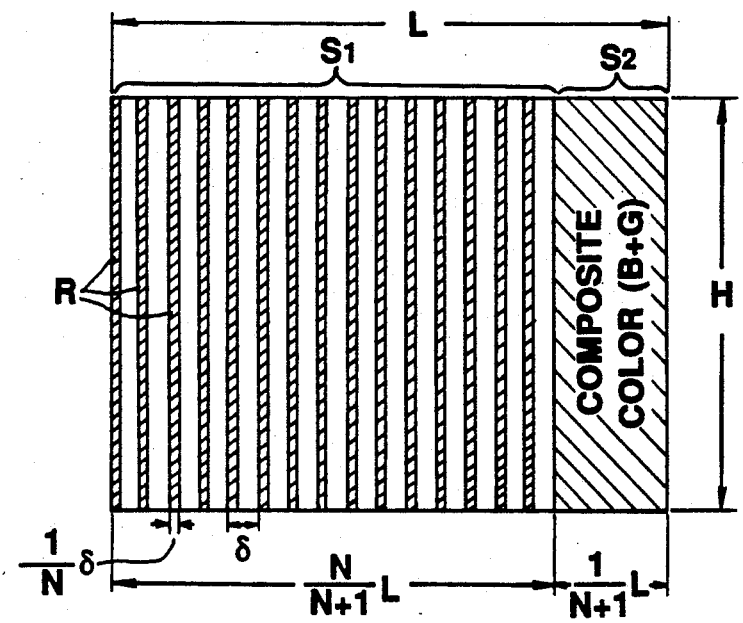
FIG. 7 shows an image displayed on the display screen of a color CRT for carrying out measurement according to the preferred embodiment of the present invention.

Data regarding the luminescent line intervals and the domain not to be measured are transmitted to the pattern generator 15 by way of the CPU 8. The pattern generator 15 produces an image signal for displaying an image as shown in FIG. 7 and transmits the same to the color CRT 1. That is to say, the display screen 2 is divided into a domain $S_2$ not to be measured, selected according to data from the no measurement area calculating means 12, and a domain to be measured $S_1$ which is an area of the display 2 other than the formerly mentioned domain $S_2$. In the domain $S_1$ a luminescent bar pattern is displayed in which a plurality of luminescent lines of red, green or blue are arranged at predetermined intervals $\delta$ and are shifted across the domain $S_1$ by intervals of one-Nth of $\delta$, where N is an integer greater than 2 (N:4 in this embodiment).

Conversely, in the domain $S_2$, a composite of the two primary colors, other than the primary color currently being displayed as a bar pattern, is cast in a daubed, or mixed, condition. It will be noted that the total area of the plurality of luminescent lines in the domain $S_1$ is set substantially equal to the area of a picture image of each color on the domain $S_2$. The picture image of a color is the area of the display illuminated by an electron beam of that color. The domain of the composite color is the total picture image of the combined colors. Thus, if the value of the shift of the luminescent lines is set to one-Nth of the interval $\delta$, the area of the domains $S_1$ and $S_2$ are set to N:1, and the proportion of the width of the luminescent lines to the intervals $\delta$ are set to 1/N. Accordingly each area is calculated according to the equation;

$$B=G=(1/(N+1))\cdot H, \quad R=(N/(N+1))\cdot H \qquad (2)$$

where, H=the vertical height of the display screen and L=the horizontal width of the display screen.

Accordingly, all areas are substantially equal to each other. In the present embodiment the areas of the domains $S_1$ and $S_2$ are set to 4:1 since N=4, the proportion of the width of the luminescent line to the intervals $\delta$ of the luminescent lines are set to ¼.

Figure 8:
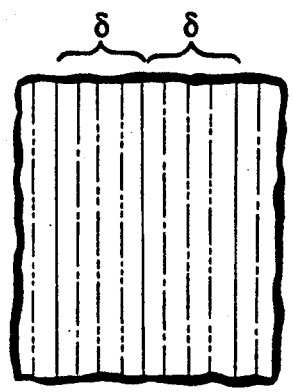
FIG. 8 indicates a degree of shift of a plurality of luminescent lines of a primary color displayed by a pattern generator according to the present invention.

Further, as shown in FIG. 8, in the above mentioned luminescent line pattern, the locations of the lines are shifted successively from the positions indicated by the solid lines to the positions indicated by the one-dot chain lines, the two-dot chain lines and three-dot chain lines, and these positional changes are repeated. When such lines are produced on the display screen 2, a detection output from the light sensor 4 gives discrete light intensity data having a characteristic such that the light intensity at the time points having intervals of change-over frames, that is, A, B, C, D, a, b, c, d, ... varies in the manner of an A.C. current.

Accordingly, the light sensor 4 can be located at an arbitrary position on the viewing screen 2 of the CRT 1 as shown in FIG. 5 and, in principle, the period of measurement can be as short as a four frame period. Further the pattern generator 15 is capable of producing the luminescent lines in a vertical direction, as shown in FIG. 7, or in a horizontal direction, perpendicular to the above.

Figure 11:
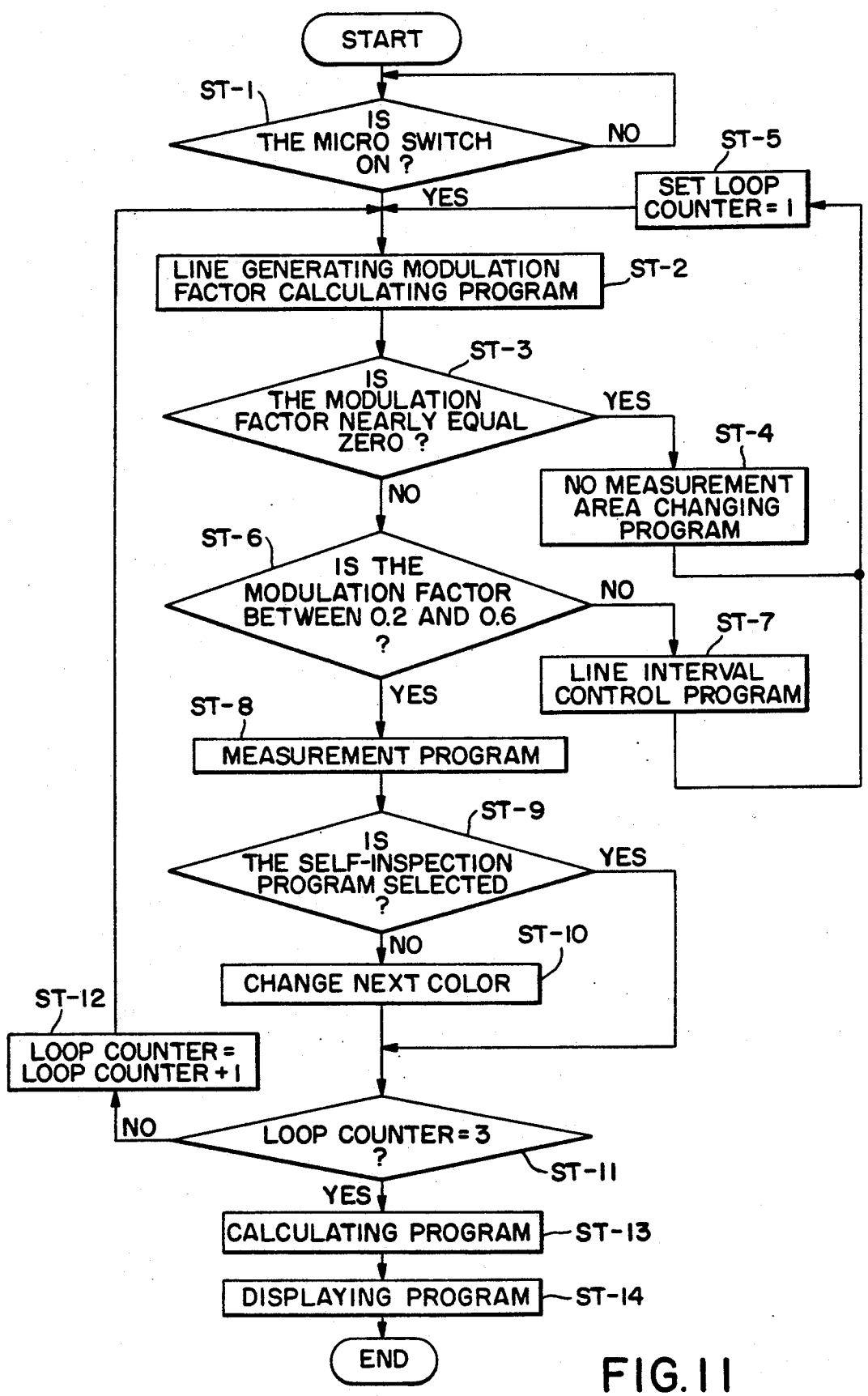
FIG. 11 is a flow chart showing the processing steps for self-inspecting convergence measurement according to the invention.
Figure 12:
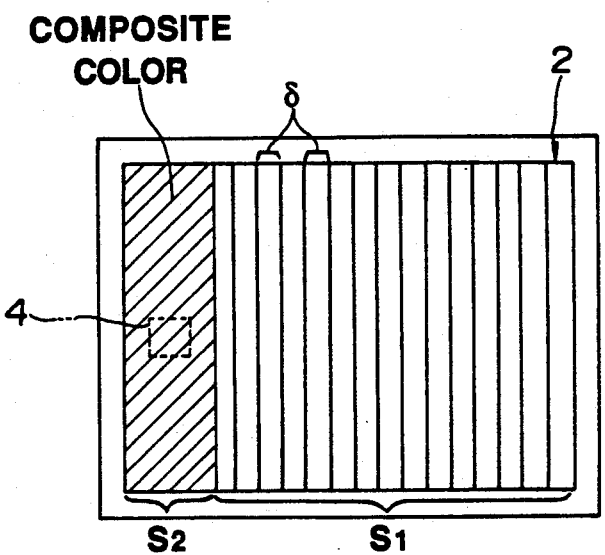
FIG. 12 shows a display generated by a pattern generator of the invention arranged opposite the pattern of FIG. 7 wherein a light sensor is place on a domain not to be measured.
Figure 13:
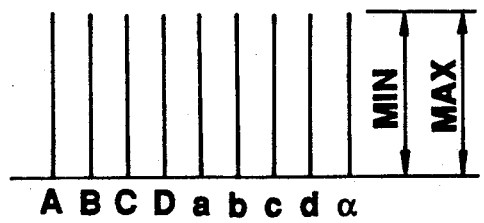
FIG. 13 shows change over frame intervals of a color CRT.

Now an explanation will be given of the operation of the above-described arrangement, with reference to the flow-chart shown in FIG. 11.

At the decision step ST-1, when the light sensor 4 is brought into contact with the viewing screen 2 of the color CRT 1 at an arbitrary position, the microswitch SW becomes ON and the CPU 8, which has until this point been repeating the decision step ST-1, activates the modulation degree calculating program at step ST-2. That is to say, the line interval data from the line interval calculating means 11 and the domain not to be measured data from the no measurement area calculating means 12 are transmitted to the pattern generator 15 in response to a control signal from the CPU 8. The pattern generator 15 creates an image signal in accordance with these data and, as shown for example in FIG. 7, luminescent lines of red are distributed over the domain $S_1$ while a combination color composed of blue and green is cast over the domain $S_2$.

These luminescent lines are shifted on the screen for each frame and data of the light intensity for each shift (refer to FIG. 5) are entered into the measuring data memory 7. When the data of the light intensity of red is memorized, the modulation degree calculating program calculates the modulation degree according to the light intensity data. At step ST-3, if it is determined by the CPU 8 that the modulation degree is zero, indicating the light sensor is placed in the $S_2$ composite color area, the no measurement area calculating means 12 interrupts at step ST-4 to change the location of the domain $S_2$, thus also changing the location of the domain $S_1$ such that the luminescent lines are repositioned where they can be read by the light sensor 4. It will be noted that with this arrangement, the light sensor can be placed in any arbitrary position on the display screen 2 without fear of hindering the measurement process. It is to be understood that the no measurement area changing means 12 is constituted by the CPU 8 carrying out a program, the details of which will be explained further herein in reference to FIG. 14. After completion of the no measurement area changing program at step ST-4, the CPU proceeds to set a loop counter=1 at step ST-5 and returns to repeat step ST-2.

Figure 9:
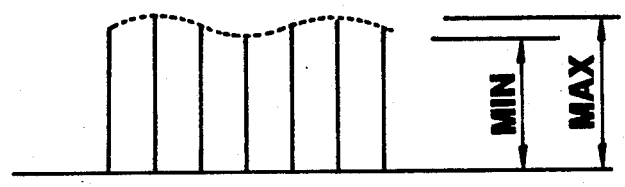
FIGS. 9 and 10 show respectively light intensity data (envelope curve) for a minimum optimum modulation level and a maximum optimum modulation level for measurement according to an embodiment of the invention.
Figure 10:
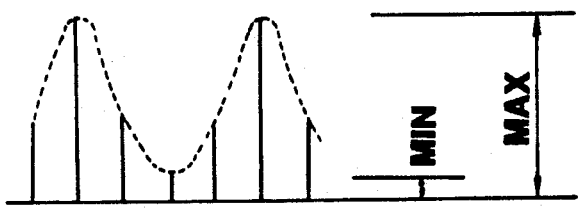

Further, assuming that the modulation factor F is not zero, as determined at step ST-3, if the light sensor is placed on the domain area $S_1$ when the line interval $\delta$ is smaller than an optimum value, the light intensity data assumes a characteristic as shown in FIG. 9, the modulation degree being less than 0.2. Conversely, if the interval $\delta$ of the lines is larger than an optimum value, the light intensity data assumes a characteristic as shown in FIG. 10, the modulation degree being greater than 0.6. This determination is made by the CPU 8 at step ST-6. In either case, i.e. F is not within the range of 0.2 to 0.6, then the process flow is interrupted at step ST-7 by the line interval calculating means 11, which constitutes the CPU carrying out a program, the details of which will be explained further in reference to FIG. 15. In carrying out the line interval control program at step ST-7, the modulation data calculated at step ST-2 is used by the CPU 8 to calculate a suitable interval $\delta$ for the lines. The CPU 8 then proceeds to the step ST-5 and repeats the program steps ST-2, et seq. The new line spacing data is then transmitted to the pattern generator 15 to be implemented on the display screen.

After it is determined at step ST-6 that the modulation factor is within the prescribed range, the CPU 8 proceeds to the measurement program at step ST-8. In the measurement program a single color display of luminescent lines is cast on the domain $S_1$. The light intensity data, as shown in FIG. 5, is stored in the measuring data memory 7 for each color each time the step ST-8 is repeated.

It is next determined at a step ST-9 whether the self-inspection program has been selected by the operator through the keyboard 14. If the answer is no, the program proceeds to step ST-10 wherein the CPU 8 instructs the pattern generator 15 to select the next of the three primary colors for the bar display and to change the colors of the image on the no measurement area $S_2$ side of the screen. If the answer at step ST-9 is yes, the CPU 8 proceeds directly to step ST-11, causing a line pattern of one color only (e.g. red) to be subjected to the measurement and mis-convergence calculation programs. The peak light intensity values of successive tests of the same color are transferred to the display program for display by the display section 13. If system operation is normal, the peak values for each measurement cycle will be substantially identical. If a variation occurs in the peak values for successive measurement of a single color, an abnormality of the system can be assumed.

According to the present embodiment, the line pattern used in the self-inspection program is identical to the one generally used in measurement processing, however, luminescent lines can alternatively be arranged at intervals of $\frac{1}{8}$ of $\delta$, rather than $\frac{1}{4}$, as this is considered the maximum detectable error and accordingly a very high degree of accuracy can be established when calibrating the system. It will be noted that red is used as the test color for the self-inspection program and, although other colors can be used, the afterglow intensity of red light after one field period (16.7 ms at 60 MHz) is the smallest for the phosphors generally used in television receivers. Accordingly, it is preferable to use a red pattern as used in the present embodiment since it is possible to prevent inspection results from being affected by afterglow and allows a finer resolution line pattern to be used for calibration. Alternatively, any color whose afterglow period is small enough to allow a desired accuracy of testing can be used.

After steps ST-9 or ST-10, the CPU 8 checks at step ST-11 to see if the loop counter=3, i.e. the steps ST-2 to ST-10 have been repeated three times. If not, the CPU 8 increases the count of the loop counter by 1 at step ST-12 and returns to step ST-2. If the answer at step ST-11 is yes, then the mis-convergence value calculating program is carried out at step ST-13 by retrieving the light intensity data stored in the memory 7 at step ST-8 for each color and calculating the difference between the time points (positions) at which the peak values occur in the light intensity values for each color, that is a mis-convergence value.

The display program is activated at step ST-14 so as to display the mis-convergence value on the display section 13. It is noted that the display data can be displayed directly on the display screen 2 of the CRT under test or, alternatively a separate display means, such as an LCD for example, can be provided. Further it is noted that as mentioned above the pattern generator 15 can shift both vertical and horizontal line patterns on the domain $S_1$ thus allowing measurement of both vertical and horizontal mis-convergence to be carried out.

Figure 14:
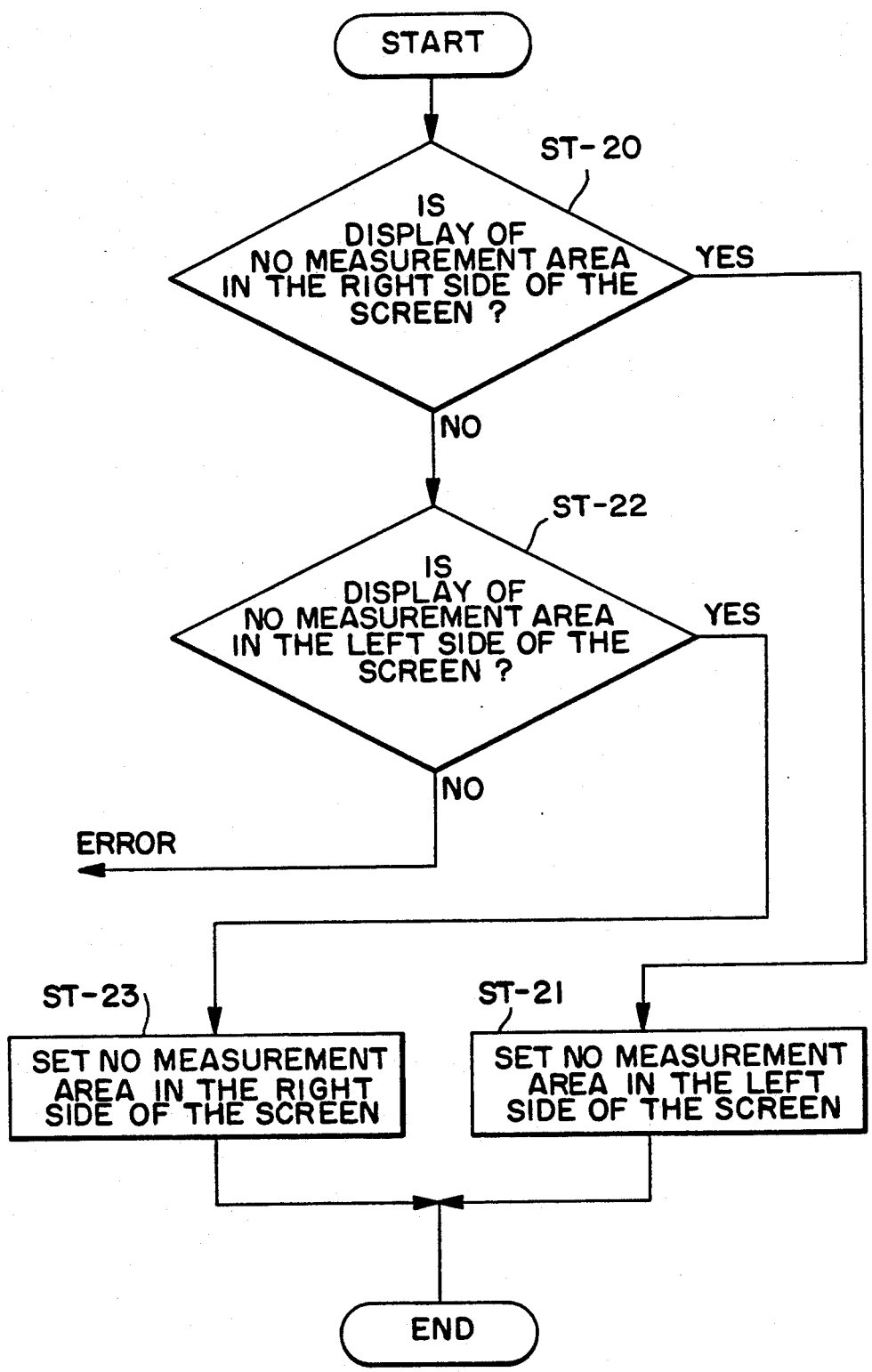
FIG. 14 is a flow chart showing the processing steps for the no measurement area changing program according to the invention.

Referring now more particularly to FIG. 14, the no measurement area calculating program will be explained. At step ST-20 the CPU 8 determines whether or not the display of the no measurement area $S_2$ is on the right side of the display screen 2. If the answer is yes, the CPU 8 proceeds to step ST-21 to set the no measurement area to be displayed on the left side of the screen 2 and then ends the program. If, on the other hand, the answer at step ST-20 is no, the CPU 8 proceeds to step ST-22 where it determines if the display of the no measurement area $S_2$ is on the left side of the display screen 2. If the answer is no, an error message is generated. If the answer is yes, the CPU 8 then sets the no measurement area to the right side of the display screen 2 at step ST-23 and ends the program.

Figure 15:
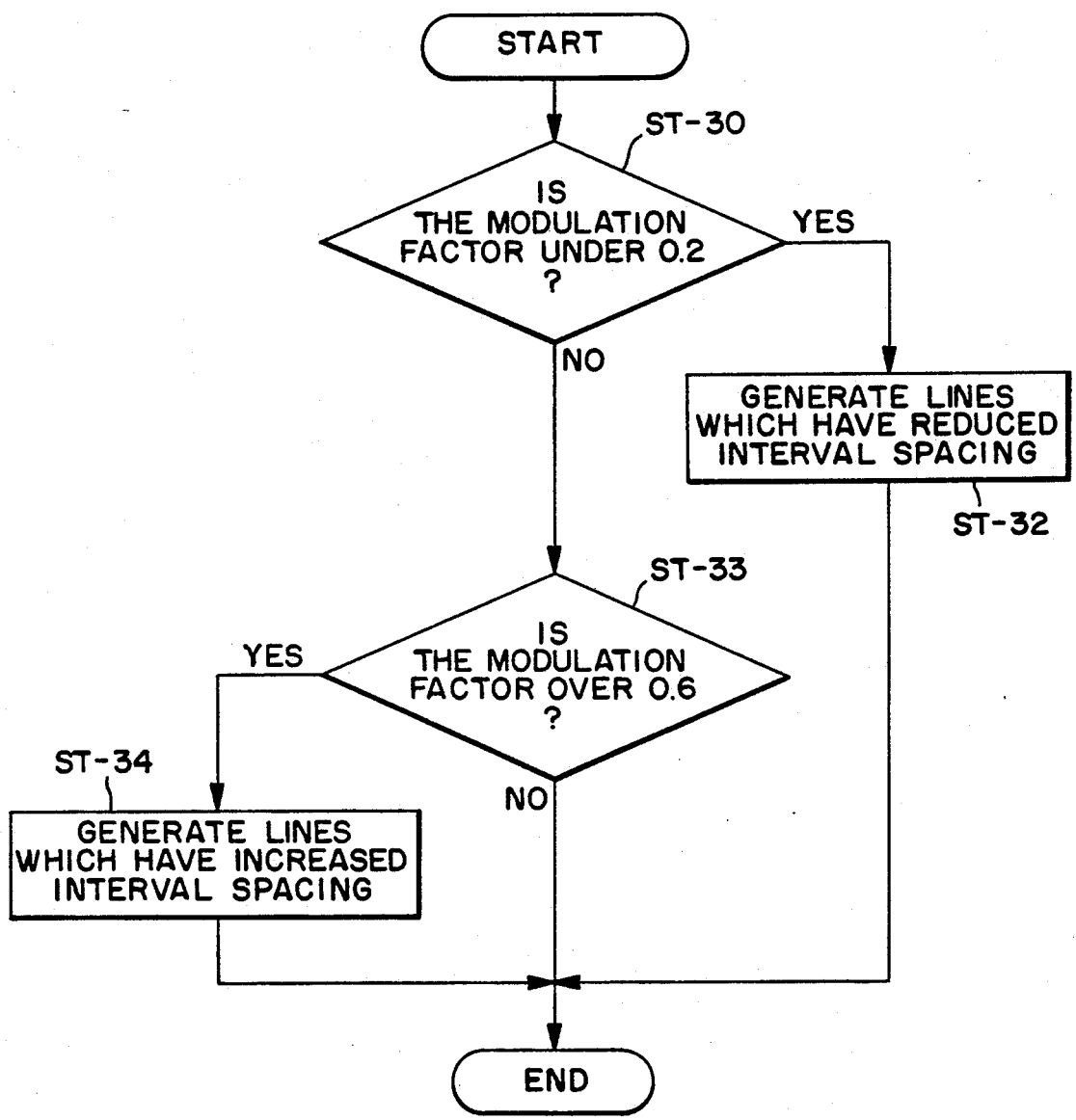
FIG. 15 is a flow chart showing the processing steps for line interval control program according to the invention.

Referring now more particularly to FIG. 15, the line interval control program followed by the CPU 8 will be explained. At an initial step ST-30, the CPU 8 determines if the modulation factor is less than 0.2. If so, the CPU 8 proceeds to a step ST-32 where the pattern generator 15 is commanded to generate lines with a reduced interval spacing and then ends the program. If the answer at step ST-30 is no, the CPU 8 next determines at step ST-33 if the modulation factor is greater than 0.6. If so, the CPU 8 at step ST-34 commands the pattern generator 15 to generate lines with an increased interval spacing and then ends the program.

During the above-described processes, since the total area of the luminescent lines is always equal to the area of the picture image of each of the two colors not being measured, the current values of the colors energized by the color CRT are constant. Thus, no positional fluctuation is induced by high-voltage variations, allowing extremely accurate measurement to be carried out.

Although in the present embodiment a composite color is cast in the domain $S_2$, the primary colors in the domain not to be measured can alternatively be cast separately, in discrete sections, or with a partial overlap or any other arrangement such that the picture image of each color is held equal. It will be additionally noted however that the total picture image of each color need not be kept completely equal if they fall in a range where no variation of high-voltage occurs in the color CRT.

As mentioned above, according to the present invention, since a convergence measuring apparatus wherein luminescent lines of primary colors are cast on the display screen of a CRT and the light intensity data for each color is compared to determine a mis-convergence value, the display screen being divided into two domains with the current values of red, green and blue being substantially constant during measurement, it is possible to eliminate detrimental effects upon the frequency characteristics of the drive circuits or the like for red, blue and green in the color CRT and the rise-up characteristic (low range frequency characteristic) of the cathode of the CRT.

While the present invention has been disclosed in terms of the preferred embodiment in order to facilitate better understanding thereof, it should be appreciated that the invention can be embodied in various ways without departing from the principle thereof. Therefore, the invention should be understood to include all possible embodiments and modifications to shown embodiments which can be embodied without departing from the principle of the invention as set out in the appended claims.

We claim:

1. A convergence measuring apparatus for a color CRT having a display screen, comprising:
    pattern generating means for generating a convergence measurement, color bar signal and a plane signal, both for display on the display screen of the CRT, wherein the pattern generating means generates a pattern of a plurality of bars of one primary color, the bars being displayed at a constant spacing from each other, and a plane area of the other primary colors which are not displayed as a bar pattern;
    light sensing means having a single peaked directional response for outputting a signal representative of input light received from the display screen; and
    mis-convergence calculating means, supplied with the signal output from the light sensing means, for calculating color data output from the light sensing means.

2. A convergence measurement apparatus according to claim 1, wherein the total area of the plurality of bars is nearly equal to the area of each color of the plane area.

3. A convergence measurement apparatus according to claim 2, wherein:
    the width of the plurality of bars $= (1/N) \cdot S$;
    the width of a display area of the plurality of bars $= (N/(N+1)) \cdot L$; and
    the width of the plane area is $(1/(N+1)) \cdot L$; where $N =$ a constant, $S =$ the periodic length of the bars, and $L =$ the whole width of a display screen of a CRT under test.

4. A convergence measurement apparatus according to claim 1, wherein the color of the plane area is a composite of the colors which are not currently displayed as a plurality of bars.

5. A convergence measurement apparatus according to claim 1, wherein the colors in the plane area are discrete from one another.

6. A self-inspecting convergence measurement apparatus for a color CRT having a display screen, comprising:
    light sensing means having a single peaked directional response, the means receiving light from the screen of the CRT to be tested and outputting a corresponding signal;
    pattern generating means for generating a pattern on the screen of the CRT to be tested for providing light to the light sensing means, the pattern including a measuring area of a bar pattern of a selectable color and a plane area of at least two colors, not including the color of the bar pattern;
    measuring means supplied with the output signal of the light sensing means for measuring the intensity of the light received by the light sensing means and outputting corresponding light intensity data;
    memory means for storing the light intensity data for a plurality of colors received by the light sensing means;
    calculating means for calculating a modulation degree and a mis-convergence value based on the light intensity data values for the plurality of colors;

setting means for setting the position of the bar pattern and the plane area on the CRT screen such that when the modulation degree of the light received by the light sensing means is below a first predetermined value or above a second predetermined value the setting means adjusts the line interval of the bar patterns so as to bring the modulation degree within a range between the first and second predetermined values;

inspection means for selectively causing the pattern generating means, the measuring means, the calculating means and the setting means to successively process light intensity data for a single color and comparing light intensity data generated thereby to determine variations therein;

display means for displaying the mis-convergence value determined by the calculating means and data generated by the inspection means.

7. A self-inspecting convergence measurement apparatus according to claim 6, wherein the setting means is responsive to the measuring means and determines if the modulation degree of the light intensity data is zero, and if so, the setting means changes the relative positions on the display screen of the measuring area and the plane area output from the pattern generating means such that the modulated light intensity is input to the light sensing means.

8. A self-inspecting convergence measurement apparatus according to claim 6, wherein the single color is red.

9. A self-inspecting convergence measurement apparatus according to claim 6, wherein the first predetermined modulation degree is 0.2 and the second predetermined modulation degree is 0.6.

* * * * *